(12) United States Patent
Choi et al.

(10) Patent No.: US 9,070,943 B2
(45) Date of Patent: Jun. 30, 2015

(54) ANODE ACTIVE MATERIAL INCLUDING A MULTILAYER METAL NANOTUBE, ANODE INCLUDING THE ANODE ACTIVE MATERIAL, LITHIUM BATTERY INCLUDING THE ANODE, AND METHOD OF PREPARING THE ANODE ACTIVE MATERIAL

(75) Inventors: Jae-man Choi, Hwaseong-si (KR);
Seung-sik Hwang, Seongnam-si (KR);
Moon-seok Kwon, Hwaseong-si (KR);
Min-sang Song, Seongnam-si (KR);
Jeong-kuk Shon, Hwaseong-si (KR);
Myung-hoon Kim, Seoul (KR); Han-su Kim, Seoul (KR); Un-gyu Paik, Seoul (KR); Tae-seup Song, Seoul (KP)

(73) Assignees: SAMSUNG ELECTRONICS CO., LTD. (KR);
INDUSTRY-UNIVERSITY COOPERATION FOUNDATION HANYANG UNIVERSITY (KR)

(*) Notice: Subject to any disclaimer, the term of this patent is extended or adjusted under 35 U.S.C. 154(b) by 303 days.

(21) Appl. No.: 13/546,403

(22) Filed: Jul. 11, 2012

(65) Prior Publication Data
US 2013/0022870 A1 Jan. 24, 2013

(30) Foreign Application Priority Data

Jul. 19, 2011 (KR) .................. 10-2011-0071549

(51) Int. Cl.
*H01M 4/36* (2006.01)
*H01M 4/38* (2006.01)
*H01M 4/04* (2006.01)
*H01M 10/0525* (2010.01)
*H01M 4/02* (2006.01)

(52) U.S. Cl.
CPC ............ *H01M 4/386* (2013.01); *H01M 4/0428* (2013.01); *H01M 4/0471* (2013.01); *H01M 4/364* (2013.01); *H01M 4/366* (2013.01); *H01M 10/0525* (2013.01); *H01M 2004/027* (2013.01); *Y02E 60/122* (2013.01)

(58) Field of Classification Search
None
See application file for complete search history.

(56) References Cited

U.S. PATENT DOCUMENTS

| 2011/0104551 A1 | 5/2011 | Yang et al. |
| 2011/0159365 A1 | 6/2011 | Loveness et al. |
| 2011/0159367 A1 | 6/2011 | Kim et al. |

FOREIGN PATENT DOCUMENTS

| KR | 1020030020298 A | 3/2003 |
| KR | 1020100032059 A | 3/2010 |
| KR | 1020100093465 A | 8/2010 |

(Continued)

OTHER PUBLICATIONS

Extended European Search Report for corresponding European Patent Application No. 12 17 6104, dated Nov. 15, 2012, 7 pages.

(Continued)

*Primary Examiner* — Cynthia K Walls
(74) *Attorney, Agent, or Firm* — Cantor Colburn LLP (57) ABSTRACT

An anode active material, an anode including the anode active material, a lithium battery including the anode, and a method of preparing the anode active material. The anode active material includes: a multilayer metal nanotube including: an inner layer; and an outer layer on the inner layer, wherein the inner layer includes a first metal having an atomic number equal to 13 or higher, and the outer layer includes a second metal different from the first metal.

39 Claims, 7 Drawing Sheets

(56) References Cited

FOREIGN PATENT DOCUMENTS

| KR | 1020100136073 A | 12/2010 |
| WO | 2010129910 A2 | 11/2010 |
| WO | 2010138617 A2 | 12/2010 |

OTHER PUBLICATIONS

Park, Mi-Hee, et al., "Silicon Nanotube Battery Anodes", Nano Letters, 2009, vol. 9, No. 11, pp. 3844-3847.

FIG. 6

ANODE ACTIVE MATERIAL INCLUDING A MULTILAYER METAL NANOTUBE, ANODE INCLUDING THE ANODE ACTIVE MATERIAL, LITHIUM BATTERY INCLUDING THE ANODE, AND METHOD OF PREPARING THE ANODE ACTIVE MATERIAL

This application claims priority to and the benefit of Korean Patent Application No. 10-2011-0071549, filed on Jul. 19, 2011, and all the benefits accruing therefrom under 35U.S.C. §119, the content of which is incorporated herein in its entirety by reference.

BACKGROUND

1. Field

The present disclosure relates to an anode active material including a multilayer metal nanotube, an anode and a lithium battery including the anode active material, and methods of preparing the anode active material.

2. Description of the Related Art

A representative example of an anode material for a lithium battery is a carbonaceous material such as graphite. Graphite has excellent capacity retention characteristics and voltage characteristics, and the volume of graphite changes minimally during intercalation or deintercalation of lithium. Thus, the stability of a battery including graphite is high. A theoretical capacity of graphite is about 372 milliampere-hours per gram (mAh/g) and an irreversible capacity thereof is high.

Metals alloyable with lithium may be used as anode active materials for lithium batteries. Examples of metals alloyable with lithium are silicon (Si), tin (Sn), and aluminum (Al). Metals alloyable with lithium have a large capacity. For example, Si has a capacity 10 times greater than that of graphite. However, the metals alloyable with lithium expand or contract during charging or discharging, thereby isolating an active material in an electrode, and such metals can promote electrolyte decomposition, due to the increased specific surface area.

To reduce the volume expansion of the metals alloyable with lithium and address electrolyte decomposition, the metals alloyable with lithium may be prepared as nano-size structures. For example, a silicon nanotube used as an anode active material is disclosed by Park et al. in *Nano Letters*, 2009, 9, pp. 3844-3847. However, while the silicon nanotube has high capacity retention characteristics, its high-rate characteristics are poor.

Thus there remains a need for a high capacity anode active material with improved capacity retention characteristics and high-rate capability.

SUMMARY

Provided is an anode active material including a multilayer metal nanotube.

Provided is an anode including the anode active material.

Provided is a lithium battery including the anode.

Provided are methods of preparing the anode active material.

Additional aspects will be set forth in part in the description which follows and, in part, will be apparent from the description.

According to an aspect, an anode active material includes: a multilayer metal nanotube including: an inner layer; and an outer layer on the inner layer, wherein the inner layer includes a first metal having an atomic number equal to 13 or higher, and the outer layer includes a second metal different from the first metal.

According to another aspect, an anode includes the anode active material described above.

Also disclosed is a lithium battery including the anode.

According to another aspect, a method of preparing an anode active material includes: growing a metal oxide nanorod which extends away from a surface of a conductive substrate; forming a first metal layer including a first metal on the metal oxide nanorod to form a coated metal oxide nanorod; thermally treating the coated metal oxide nanorod to selectively remove the metal oxide nanorod and form a first metal nanotube; and forming a second metal layer including a second metal on the first metal nanotube to form a multilayer metal nanotube to prepare the anode active material.

Also disclosed is an anode active material including: a multilayer metal nanotube having a length of about 1 micrometer or greater and an outer diameter of about 30 nm to about 400 nm, the multilayer metal nanotube including an inner layer, which includes a first metal and which defines an empty inner space, and an outer layer which includes a second metal, wherein the first metal and the second metal are selected to reversibly intercalate lithium.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an exemplary embodiment of an anode active material, a method of preparing the same, an anode including the anode active material, and a lithium secondary battery including the anode will be described in further detail.

According to an embodiment, an anode active material includes a multilayer metal nanotube including: an inner layer; and an outer layer on the inner layer; wherein the inner layer includes a first metal having an atomic number equal to 13 or higher, and the outer layer includes a second metal different from the first metal.

Figure 1A:
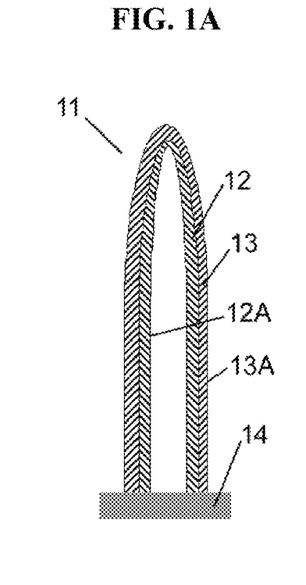
FIG. 1A is a schematic illustration of an embodiment of an anode active material on a conductive substrate.

FIG. 1A is a schematic view of an embodiment of the anode active material comprising the multilayer metal nanotube 11. The multilayer metal nanotube 11 comprises a plurality of layers, including the inner layer 12 that has an inner surface 12A (e.g., an inner wall) that defines an empty inner space of the multilayer metal nanotube, and the outer layer 13 that is disposed (e.g., formed) on the inner layer in a thickness direction thereof and includes an outer surface 13A (e.g., an outer wall).

Figure 1B:
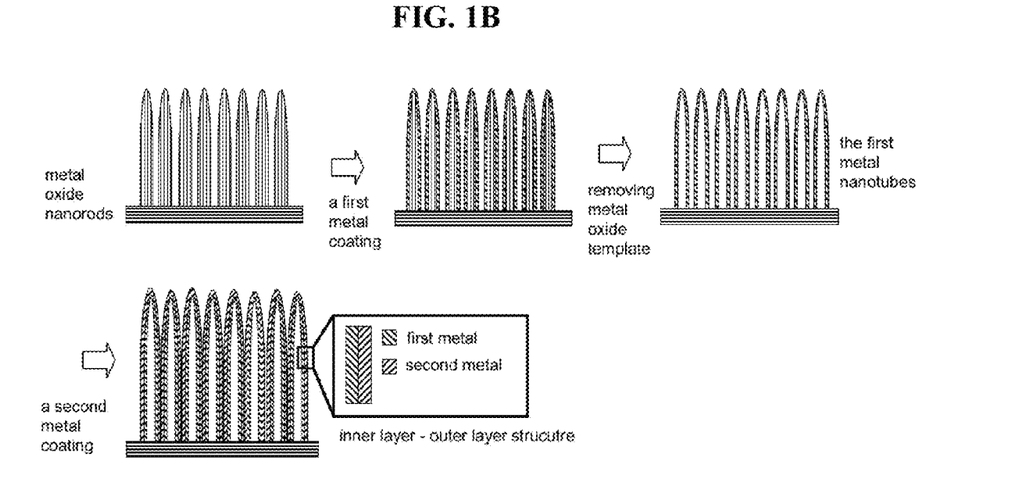
FIG. 1B is a schematic view illustrating an embodiment of a method of preparing an anode according to Example 1.

FIG. 1B is a schematic view of a method of preparing the multilayer metal nanotube.

While not wanting to be bound by theory, it is understood that the multilayer metal nanotube may have improved charging and discharging characteristics, as compared to a single-layer metal nanotube, due to the different metals respectively included in the inner layer and the outer layer.

One possible reason why the multilayer metal nanotube provides improved charging and discharging characteristics is disclosed below in further detail, however, the present invention shall not be limited to this explanation.

The multilayer metal nanotube may compensate for the drawbacks of a single-layer metal nanotube comprising a first metal. At the same time, the multilayer metal nanotube may improve charging and discharging characteristics of a metal nanotube when a second metal having sufficient miscibility with the first metal is disposed as a separate layer on a surface of the single-layer metal nanotube including the first metal. For example, the second metal layer may be coated on a surface of a single-layer first metal nanotube, which has high reactivity with respect to an electrolyte solution. The second metal is relatively stable with respect to the electrolyte and may form a stable interface with the first metal of the multilayer metal nanotube, which has a high reactivity. Thus, the lifetime characteristics of a lithium battery including the multilayer metal nanotube may be improved.

Accordingly, the combination of the first metal and the second metal in the multilayer metal nanotube is not limited as long as the first and second metals have an atomic number equal to 13 or greater and provide improved charging and discharging characteristics of a lithium battery.

The second metal may have a resistivity p which is less than a resistivity of the first metal. That is, the second metal may have a conductivity which is greater than a conductivity of the first metal. For example, the resistivity of the second metal may be 1/100 or less of that of the first metal, specifically 1/1000 of that of the first metal. For example, the resistivity of the second metal may be equal to or less than about 5Ω·m at Ω·m at 20° C., specifically about 0.01 to about 5Ω·m, more specifically about 0.1 to about 4Ω·m at 20° C., and a resistivity of the first metal may be equal to or greater than about 500Ω·m at 20° C., specifically about 1 to about 500Ω·m, more specifically about 5 to about 400Ω·m. Because the second metal has a lower resistivity than the first metal, the surface conductivity of the multilayer metal nanotube may be improved, thereby improving the reversibility of an electrode reaction.

Diffusivity of lithium ions in the second metal may be greater than a diffusivity of lithium ions in the first metal. That is, lithium ions may diffuse more easily in the second metal than in the first metal. As the lithium ions are diffused more easily in the second metal than in the first metal, an activation energy barrier of diffusion of lithium ions is reduced, thereby improving the reversibility of an electrode reaction. For example, the lithium ion diffusivity of the second metal may be 10 times or greater than that of the first metal, specifically 5 to 100 times greater that the lithium ion diffusivity of the first metal. For example, the lithium ion diffusivity of the second metal may be about $2 \times 10^{-7}$ cm$^2$/s or greater at 360° C., specifically about $2 \times 10^{-7}$ cm$^2$/s to about $2 \times 10^{-5}$ cm$^2$/s, more specifically about $4 \times 10^{-7}$ cm$^2$/s to about $1 \times 10^{-7}$ cm$^2$/s, and the lithium ion diffusivity of the first metal may be about $0.15 \times 10^{-7}$ cm$^2$/s or less at 360° C., specifically about $0.15 \times 10^{-7}$ cm$^2$/s to about $0.15 \times 10^{-9}$ cm$^2$/s, more specifically about $0.1 \times 10^{-7}$ cm$^2$/s to about $1 \times 10^{-9}$ cm$^2$/s. Because the second metal has higher lithium ion diffusivity than the first metal, the high-rate characteristics of a lithium battery including the multilayer metal nanotube may be improved.

The second metal may have a lower volume expansion during charging or discharging than the first metal. That is, changes in volume of the second metal may be smaller than those of the first metal during charging or discharging. Because the volume expansion of the second metal is lower than that of the first metal, a maximum hoop strain of the multilayer metal nanotube may be reduced and thus expansion of the multilayer metal nanotube is reduced, thereby substantially or effectively preventing deterioration thereof. For example, the volume expansion of the second metal during charging may be about 98% or less than the volume expansion the first metal during charging. In an embodiment, the volume expansion of the second metal during charging is about 5% to about 99.9%, specifically about 10% to about 50%, more specifically about 15% to about 40% of the volume expansion of the first metal. Because the second metal has a lower volume expansion than the first metal, the lifetime characteristics of a lithium battery including the multilayer metal nanotube may be improved.

The volume expansion is defined by Equation 1 below.

Volume expansion (%)=[final volume−initial volume]/initial volume×100%  Equation 1

In Equation 1, the initial volume refers to a volume of a metal before lithium is intercalated (or before charging), and the final volume refers to a volume of a metal after lithium is intercalated (or after charging).

The first metal may be at least one selected from silicon (Si), germanium (Ge), antimony (Sb), tin (Sn), aluminum (Al), zinc (Zn), silver (Ag), gold (Au), platinum (Pt), molybdenum (Mo), tungsten (W), and an alloy thereof. The alloy may include, but is not limited to, at least one element selected from Si, Ge, Sb, Sn, Al, Zn, Ag, Au, and Pt, and may comprise any element of an atomic number of 13 or greater that is available in the art.

The first metal may be a Group 14 element. For example, an inner layer of the multilayer metal nanotube may comprise a Group 14 element. For example, the first metal may be silicon.

The second metal may comprise at least one selected from Ge, Sb, Sn, Al, Zn, Ag, Au, Pt, Mo, W, and an alloy thereof, but is not limited thereto, and may comprise any element having an atomic number equal to 13 or greater that is available in the art. The first metal is different than the second metal. Thus the first metal and the second metal may be independently selected, so long as the first and second metals are different.

In an embodiment, the first metal and the second metal are selected to reversibly intercalate lithium. In an embodiment, a capacity of the first metal and the second metal are each independently selected to be about 200 to about 1400 mAh/g, specifically 400 to about 1300 mAh/g. In another embodiment, the first metal is selected to reversibly intercalate lithium and the second metal is selected to have a lithium diffusivity of about $2 \times 10^{-7}$ cm$^2$/s or greater at 360° C.

The outer layer may be a composite of the first metal and the second metal. The form of the composite of the first metal and the second metal is not limited, and may be any form which has a different composition from the inner layer and is available in the art. In an embodiment wherein the outer layer is formed of a complex of the first metal and the second metal, charging and discharging characteristics of a lithium battery including the multilayer metal nanotube may be improved.

The inner layer may be crystalline, and the outer layer may be amorphous. That is, the inner layer may comprise a crystalline phase, and the outer layer may comprise an amorphous phase. The presence of the crystalline phase and the amorphous phase may be confirmed by X-ray diffraction (XRD), transmission electron microscopy (TEM), selected area electron diffraction (SAED) or the like. FIGS. 2D and 2F show the structure of the multilayer metal nanotube.

The inner layer and/or the outer layer of the multilayer metal nanotube may further include a dopant. The dopant may improve the conductivity of the multilayer metal nanotube due to implantation of electrons or holes into the multilayer metal nanotube.

The dopant may be a Group 13 element or a Group 15 element, such as at least one selected from boron (B), aluminum (Al), gallium (Ga), indium (In), thallium (Tl), phosphorus (P), arsenic (As), antimony (Sb), and bismuth (Bi). The 13 Group element is a p-type dopant, and the 15 Group element is an n-type dopant. By adding the dopant, the reversibility of an electrode reaction may be improved.

At least one additional layer may be further included between the inner layer and the outer layer of the multilayer metal nanotube. The additional layer may include a metal which is different from those included in the inner layer and the outer layer. Due to the additional layer, charging and discharging characteristics of a lithium battery including the multilayer metal nanotube may be improved.

A carbon layer may be further disposed on the outer layer of the multilayer metal nanotube. In an embodiment wherein the carbon layer is further included, the conductivity of the multilayer metal nanotube may be improved. The carbon layer may comprise any suitable carbon available in the art. For example, the carbon layer may comprise a low-crystallinity carbon or an amorphous carbon. The carbon layer may comprise an amorphous carbon, a crystalline or graphitic carbon, or a vitreous or glassy carbon. Also, the carbon layer may have any suitable crystallographic orientation, crystallite size, interlayer spacing, or density. For example, the carbonaceous support may comprise at least one selected from a carbon black, a mesocarbon, a graphitic carbon, a pyrolytic graphite, single-wall carbon nanotubes, multi-wall carbon nanotubes, and carbon fiber. The carbon is not limited to the foregoing and the foregoing carbons may be used alone or may be used in a combination thereof.

A wall thickness of the multilayer metal nanotube may be about 5 nanometers (nm) to about 400 nm, specifically about 10 nm to about 200 nm. The wall thickness includes a thicknesses of the inner layer and the outer layer. For example, the wall thickness may be about 15 nm to about 150 nm, specifically about 20 nm to about 70 nm. The wall thickness may be appropriate for improving the capacity retention, i.e., minimizing capacity fade, and improving charging and discharging efficiency, and improving high-rate characteristics of a lithium battery including the multilayer metal nanotube. However, the wall thickness is not limited thereto, and may also be outside the above-described range. For example, with the wall thickness in the above range, the possibility of an undesirable side reaction due to an increased specific surface area is reduced, and mechanical deterioration of the multilayer metal nanotube due to charging and discharging may be reduced.

The inner layer of the multilayer metal nanotube may have a thickness of about 4 nm to about 200 nm, specifically about 5 nm to about 100 nm. For example, the thickness of the inner layer may be about 7 nm to about 70 nm. For example, the thickness of the inner layer may be about 10 nm to about 40 nm. The thickness of the inner layer may be appropriate for improving the capacity retention, i.e., minimizing capacity fade, and improving charging and discharging efficiency, and high-rate characteristics of a lithium battery including the multilayer metal nanotube. However, the thickness of the inner layer may also be outside the above-described range.

The outer layer of the multilayer metal nanotube may have a thickness of about 4 nm to about 200 nm, specifically about 5 nm to about 100 nm. For example, the thickness of the outer layer may be about 2 nm to about 70 nm. For example, the thickness of the outer layer may be about 5 nm to about 30 nm. The thickness of the outer layer may be appropriate for improving the capacity retention, i.e., minimizing capacity fade, and improving charging and discharging efficiency, and high-rate characteristics of a lithium battery including the multilayer metal nanotube. However, the thickness of the outer layer may also be outside the above-described range.

The multilayer metal nanotube may have an outer diameter of 30 nm or greater. For example, the outer diameter of the multilayer metal nanotube may be about 30 nm to about 400 nm. For example, the outer diameter may be about 35 nm to about 300 nm. For example, the outer diameter may be about 70 nm to about 150 nm. For example, the outer diameter may be about 80 nm to about 120 nm. The outer diameter may be appropriate for improving the capacity retention, i.e., minimizing capacity fade, and improving charging and discharging efficiency, and high-rate characteristics of a lithium battery including the multilayer metal nanotube. However, the outer diameter of the multilayer metal nanotube may also be outside the above-described range.

The multilayer metal nanotube may have an inner diameter of about 10 nm to about 400 nm, specifically about 20 nm to about 200 nm. For example, the inner layer may define a space, e.g., an empty space, in the multilayer metal nanotube having an inner diameter of about 20 nm to about 200 nm. For example, the inner diameter may be about 30 nm to about 150 nm. For example, the inner diameter may be about 40 nm to about 100 nm. The inner diameter may be suitable for improving the capacity retention, i.e., minimizing capacity fade, and improving charging and discharging efficiency, and high-rate characteristics of a lithium battery including the multilayer metal nanotube. However, the inner diameter of the empty space in the multilayer metal nanotube may also be outside the above-described range.

The multilayer metal nanotube may have a length of about 1 μm or greater. For example, the length of the multilayer metal nanotube may be about 1 μm to about 50 μm. For example, the length of the multilayer metal nanotube may be about 1 μm to about 30 μm. For example, the length of the multilayer metal nanotube may be about 1 μm to about 20 μm. The length of the multilayer metal nanotube may be appropriate for improving the capacity retention, i.e., minimizing capacity fade, and improving charging, and discharging efficiency, and high-rate characteristics of a lithium battery including the multilayer metal nanotube. However, the length of the multilayer metal nanotube may also be outside the above-described range.

An end of the multilayer metal nanotube may be open or closed. In an embodiment, the end of the multilayer metal nanotube may be closed, like a test tube. The closed end may be in various forms and have any suitable shape; for example, the end may be planar or hemi-spherical. In an embodiment, the empty inner space of the multilayer metal nanotube is defined by the inner surface of the nanotube, including the inner surface of the closed end, if present.

An anode according to an embodiment includes an anode active material including the multilayer metal nanotube.

The anode may include: a conductive substrate 14, an embodiment of which is shown in FIG. 1A; and a plurality of multilayer metal nanotubes which are disposed on the conductive substrate at a selected interval. The anode may have a single-body, e.g., an indivisible structure, in which the multilayer metal nanotubes, which are the anode active material, are connected to the conductive substrate, which is a current collector. In an embodiment, the conductive substrate and the multilayer metal nanotube may form a single unitary body.

The multilayer metal nanotubes may be spaced apart in the anode at an interval of about 100 nm or less. For example, the multilayer metal nanotubes may be spaced apart at an interval of about 10 nm to about 90 nm, specifically about 20 nm to about 80 nm, but the interval is not limited thereto, and the multilayer metal nanotubes may also be arranged densely, e.g., without an interval.

The multilayer metal nanotubes of the anode may be aligned, and may extend in a direction away from a surface of the conductive substrate. For example, the multilayer metal nanotubes may be oriented at an angle of 45° to about 135° with respect to the surface of the conductive substrate. For example, the multilayer metal nanotubes may be oriented at an angle of 80° to about 80° with respect to the surface of the conductive substrate. For example, the multilayer metal nanotubes may extend in a direction perpendicular to the surface of the substrate. The alignment of an embodiment of the anode as described above is illustrated in FIGS. 2A and 2B. It is possible that the anode including the multilayer metal nanotubes which are aligned in a direction perpendicular to the conductive substrate is appropriate for improving the capacity retention, charging and discharging efficiency, and high-rate characteristics of a lithium battery including the anode. However, the direction of alignment may also be different from the above-described direction.

In the anode, a volume expansion of the multilayer metal nanotube in a length direction may be 100% or less. For example, during charging or discharging of the anode in a voltage range of 0.01 volts (V) to 2 V (vs. Li metal) using a current of 150 milliamperes (mA) per gram (g) of the multilayer metal nanotubes, a volume expansion of the multilayer metal nanotube in a length direction may be about 100% or less. For example, the volume expansion in a length direction may be 0% to about 100%. For example, the volume expansion in a length direction may be about 1% to about 70%, specifically about 2% to about 60%. For example, the volume expansion in a length direction may be about 42% or less. For example, the volume expansion in a length direction may be 0% to about 42%. In the present specification, the volume expansion in a length direction is defined by Equation 2 below.

$$\text{Volume expansion in length direction [\%]} = (L1-L2)/L2 \times 100\% \quad \text{Equation 2}$$

In Equation 2, L1 denotes a length of multilayer metal nanotubes in which lithium is intercalated, and L2 denotes a length of multilayer metal nanotubes prior to lithium intercalation, e.g., as prepared.

L2 may correspond to a length of multilayer metal nanotubes included in an anode before being assembled into a battery. L1 may correspond to a maximum length of metal nanotubes intercalated with lithium as may be obtained from a charging/discharging cycle of 40 C or less, e.g., 0.1 C.

In the anode, the multilayer metal nanotubes may occupy about 50% to about 99%, specifically about 55% to about 96%, more specifically about 60% to about 93%, of the total surface area of the conductive substrate. The surface area occupied by the multilayer metal nanotubes may be calculated based a projected area, e.g., using the outer diameter of the multilayer metal nanotubes. For example, the surface area occupied by the multilayer metal nanotubes may be 51% of or greater, specifically about 51% to about 99%, specifically about 60% to about 95% of the total surface of the conductive substrate. For example, the surface area of the conductive substrate occupied by the multilayer metal nanotubes may be equal to or greater than 70% of the total surface of the conductive substrate. For example, the surface area of the conductive substrate occupied by the multilayer metal nanotubes may be equal to or greater than 80% of the total surface of the conductive substrate. For example, the surface area of the conductive substrate occupied by the multilayer metal nanotubes may be equal to or greater than 90% of the total surface of the conductive substrate. As the surface area occupied by the multilayer metal nanotubes increases, the capacity of the anode also increases.

The conductive substrate may be at least one selected from stainless steel, copper, nickel, iron, and cobalt, but is not limited thereto. The conductive substrate may be any metal substrate that has sufficient conductivity, suitable chemical properties, and is available in the art.

For example, the conductive substrate may be a conductive oxide substrate or a conductive polymer substrate. Also, instead of a substrate that is entirely formed of a conducting material, the conductive substrate may have various structures such as a structure in which at least one of a conductive metal, a conductive metal oxide, and a conductive polymer are coated on a surface of an insulating substrate.

The conductive substrate may be a flexible substrate. For example, the conductive substrate may have a suitable modulus and may easily bend. Also, after bending, the conductive substrate may easily restore its original form.

A thickness of the conductive substrate may be about 10 mm or less, however, the thickness may also be outside this range. For example, the thickness of the conductive substrate may be about 0.1 µm to about 10 mm. For example, the thickness of the conductive substrate may be about 0.1 µm to about 1000 µm. For example, the thickness of the conductive substrate may be about 1 µm to about 100 µm.

A conductive substrate on which multilayer metal nanotubes are disposed may be used as the anode.

Alternatively, the anode may further include a second anode active material different from the multilayer metal nanotubes.

For example, the anode may further include a second anode active material composition including a commercially available anode active material, a conducting agent, a binder, and a solvent, in addition to the conductive substrate on which the multilayer metal nanotubes are disposed.

For example, after the second anode active material composition is prepared, the composition may be coated directly on the conductive substrate on which the multilayer metal nanotubes are arranged to form an anode substrate. Alternatively, an anode active material composition comprising the second anode active material may be cast on a separate support to form an anode active material film, which is then separated from the support and laminated on the conductive substrate on which the multilayer metal nanotubes are disposed, to form an anode plate. The anode is not limited to the above-described form and may have any suitable form available as an anode in the art. For example, the anode may be manufactured by printing the conductive substrate on which the multilayer metal nanotubes are disposed with an anode active material ink including the second anode active material, an electrolyte, or the like.

Examples of the second anode active materials that may be added to the anode include, but are not limited to, at least one selected from a silicon metal, a silicon thin film, a lithium metal, a lithium alloy, a carbonaceous material such as graphite, and any anode active material that is available as an anode active material in the art may be used so long as its properties do not adversely affect the anode.

Examples of the second anode active materials include at least one selected from tungsten oxide, molybdenum oxide, titanium oxide, lithium titanium oxide, vanadium oxide, lithium vanadium oxide, Si, $SiO_x(0<x<2)$, a Si—Y alloy (wherein Y is at least one selected from an alkali metal, an alkaline earth metal, a Group 13 element, a Group 14 element, a transition metal, and rare-earth element), Sn, $SnO_2$, $SiO_2$, and Sn—Z, wherein Z is at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po. The second anode active material may be amorphous or crystalline, planar, flake-shaped, spherical, or fiber-like. The second anode active material may comprise at least one selected from natural graphite, artificial graphite; soft carbon (e.g., low-temperature sintered carbon), hard carbon; mesophase pitch carbide, and sintered coke.

The second anode active material may be in the form of a powder. The powder-like second anode active material may be included in an anode active material composition or an anode active material ink, for example.

Examples of the conducting agent include carbon black and graphite, but are not limited thereto; and any material that is available as a conducting agent in the art may be used so long as its properties do not detract from the desirable properties of the anode. The conducting agent may comprise an amorphous carbon, a crystalline or graphitic carbon, or a vitreous or glassy carbon. Also, the conducting agent may have any suitable crystallographic orientation, crystallite size, interlayer spacing, or density. For example, the conducting agent may comprise at least one selected from a carbon black, a mesocarbon, a graphitic carbon, a pyrolytic graphite, single-wall carbon nanotubes, multi-wall carbon nanotubes, and carbon fiber. The conducting agent is not limited to the foregoing and the foregoing carbons may be used alone or may be used in a combination thereof.

Examples of the binder include, but are not limited to, at least one selected from a vinylidene fluoride/hexafluoropropylene copolymer, polyvinylidene fluoride (PVDF), polyacrylonitrile, polymethyl methacrylate, polytetrafluoroethylene, and a styrene butadiene rubber polymer, or any other suitable material that is available as a binder in the art that provides suitable properties.

Examples of the solvent include, but are not limited to, N-methyl-pyrrolidone (NMP), acetone, and water, and any other suitable solvent that is available as a solvent in the art.

The amounts of the anode active material, the conducting agent, the binder, and the solvent may be selected so as to be suitable for the manufacture of a lithium battery. Suitable amounts may be determined without undue experimentation. At least one of the conducting agent, the binder and the solvent may be omitted if desired.

According to another embodiment, a lithium battery includes a cathode. For example, the lithium battery may include: an anode including the multilayer metal nanotube; a cathode; and an electrolyte interposed between the anode and the cathode. For example, the lithium battery may be manufactured in the following manner.

First, an anode according to an embodiment is prepared as described above.

Next, a cathode may be manufactured in the same manner as the anode except that a cathode active material is used instead of the anode active material.

Regarding a cathode active material composition, the same binder and solvent may be used as in the anode. A cathode active material composition may be prepared by mixing a cathode active material, a conducting agent, a binder, and a solvent. A cathode on which a cathode active material is disposed may be manufactured by directly coating an aluminum collector with the cathode active material composition and drying the same. Alternatively, the cathode active material composition may be cast on a separate support to form a cathode active material film, which is then separated from the support and laminated on an aluminum current collector to prepare a cathode plate with the cathode active material film.

The cathode active material may be any suitable lithium-containing metal oxide that is available in the art. For example, a complex oxide comprising lithium and at least one metal selected from cobalt (Co), manganese (Mn), and nickel (Ni) may be used as the cathode active material. The lithium-containing metal oxide may be at least one compound selected from $Li_aAl_{1-b}B_bD_2$ (where $0.90 \leq a \leq 1.8$, and $0 \leq b \leq 0.5$); $Li_aE_{1-b}B_bO_{2-c}D_c$ (where, $0.90 \leq a \leq 1.8$, $0 \leq b \leq 0.5$, $0 \leq c \leq 0.05$); $LiE_{2-b}B_bO_{4-c}D_b$ (where, $0 \leq b \leq 0.5$, $0 \leq c \leq 0.05$); $Li_aNi_{1-b-c}Co_bB_bD_\alpha$ (where, $0.90 \leq a \leq 1.8$, $0 \leq b \leq 0.5$, $0 \leq c \leq 0.05$, $0 \leq \alpha \leq 2$); $Li_aNi_{1-b-c}Co_bB_bO_{2-\alpha}F_\alpha$ (where, $0.90 \leq a \leq 1.8$, $0 \leq b \leq 0.5$, $0 \leq c \leq 0.05$, $0 \leq \alpha \leq 2$); $Li_aNi_{1-b-c}Co_bB_bO_{2-\alpha}F_2$ (where, $0.90 \leq a \leq 1.8$, $0 \leq b \leq 0.5$, $0 \leq c \leq 0.05$, $0 \leq \alpha \leq 2$); $Li_aNi_{1-b-c}Mn_bB_bD_\alpha$ (where, $0.90 \leq a \leq 1.8$, $0 \leq b \leq 0.5$, $0 \leq c \leq 0.05$, $0 \leq \alpha \leq 2$); $Li_aNi_{1-b-c}Mn_bB_cO_{2-\alpha}F_\alpha$ (where, $0.90 \leq a \leq 1.8$, $0 \leq b \leq 0.5$, $0 \leq c \leq 0.05$, $0 \leq \alpha \leq 2$); $Li_aNi_{1-b-c}Mn_bB_cO_{2-\alpha}F_2$ (where, $0.90 \leq a \leq 1.8$, $0 \leq b \leq 0.5$, $0 \leq c \leq 0.05$, $0 \leq \alpha \leq 2$); $Li_aNi_bE_cG_dO_2$ (where, $0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ (where, $0.90 \leq a \leq 1.8$, $0 \leq b \leq 0.9$, $0 \leq c \leq 0.5$, $0 \leq d \leq 5$, $0.001 \leq e \leq 0.1$); $Li_aNiG_bO_2$ (where, $0.90 \leq a \leq 1.8$, $0.001 \leq b \leq 0.1$); $Li_aCoG_bO_2$ (where, $0.90 \leq a \leq 1.8$, $0.001 \leq b \leq 0.1$); $Li_aMnG_bO_2$ (where, $0.90 \leq a \leq 1.8$, $0.001 \leq b \leq 0.1$); $Li_aMn_2G_bO_4$ (where, $0.90 \leq a \leq 1.8$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$.

In the formulas above, A is at least one selected from nickel (Ni), cobalt (Co), and manganese (Mn); B is at least one selected from aluminum (Al), nickel (Ni), cobalt (Co), manganese (Mn), chromium (Cr), iron (Fe), magnesium (Mg), strontium (Sr), vanadium (V), and a rare earth element, wherein the rare earth element is Sc, Y, and a lanthanoid, wherein the lanthanoid is an element of atomic numbers 57 to 71, i.e., La to Lu; D is at least one selected from oxygen (O), fluorine (F), sulfur (S), and phosphorus (P); E is at least one selected from cobalt (Co), and manganese (Mn); F is at least one selected from fluorine (F), sulfur (S), and phosphorus (P); G is at least one selected from aluminum (Al), chromium (Cr), manganese (Mn), iron (Fe), magnesium (Mg), lanthanum (La), cerium (Ce), strontium (Sr), and vanadium (V); Q is at least one selected from titanium (Ti), molybdenum (Mo), and manganese (Mn); I is at least one selected from chromium (Cr), vanadium (V), iron (Fe), scandium (Sc), and yttrium (Y); and J is at least one selected from vanadium (V), chromium (Cr), manganese (Mn), cobalt (Co), nickel (Ni), and copper (Cu).

Examples of the cathode active material include $LiCoO_2$, $LiMn_xO_{2x}$ ($x=1, 2$), $LiNi_{1-x}Mn_xO_{2x}$ ($0<x<1$), $Ni_{1-x-y}Co_xMn_yO_2$ ($0 \leq x \leq 0.5$, $0 \leq y \leq 0.5$), and $LiFePO_4$.

The compounds listed above as cathode active materials may have a surface coating layer. Alternatively, a combination of a compound without a coating layer and a compound having a coating layer may be used. The cathode active material may be a combination of compounds selected from the compounds listed above. The coating layer may include at least one selected from an oxide, hydroxide, oxyhydroxide, oxycarbonate, and hydroxycarbonate. The compounds of the coating layer may be amorphous or crystalline. The coating layer may comprise at least one selected from magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), and zirconium (Zr). The coating layer may be formed using any method that does not adversely affect the physical properties of the cathode active material. For example, the coating layer may be formed using a spray coating method, a dipping method, or the like. The coating method may be determined by one of ordinary skill in the art without undue experimentation, and thus, a further description thereof will be omitted.

The amounts of the anode electrode active material, the conducting agent, the binder, and the solvent used in the manufacture of a lithium battery may be determined by one of ordinary skill in the art without undue experimentation.

Next, a separator to be disposed between the cathode and the anode is provided. The separator for the lithium battery may be a separator that is currently used in lithium batteries. The separator may have a low resistance to migration of lithium ions in an electrolyte and may have an excellent electrolyte-retaining ability. Examples of the separator include a separator comprising at least one selected from glass fiber, polyester, Teflon, polyethylene, polypropylene, and polytetrafluoroethylene (PTFE), each of which may be included in a non-woven or woven material. For example, a rollable separator including polyethylene or polypropylene may be used for a lithium ion battery. A separator with a desirable organic electrolyte solution-retaining ability may be used for a lithium ion polymer battery. For example, the separator may be manufactured in the following manner.

A polymer resin, a filler, and a solvent may be mixed together to prepare a separator composition. Then, the separator composition may be coated directly on an electrode, and then dried to form the separator. Alternatively, the separator composition may be cast on a support and then dried to form a separator film, which may then be separated from the support and laminated on an electrode to form the separator.

The polymer resin used to manufacture the separator may be any material that is suitable for use as a binder for electrode plates. Examples of the polymer resin include a vinylidene-fluoride/hexafluoropropylene copolymer, polyvinylidene fluoride (PVDF), polyacrylonitrile, polymethylmethacrylate, and a combination thereof.

Next, an electrolyte is prepared.

The electrolyte may be a liquid or a gel. For example, the electrolyte may be an organic electrolyte solution. Alternatively, the electrolyte may be a solid. Non-limiting examples of the solid electrolyte include boron oxide and lithium nitride. Any material suitable as a solid electrolyte in the art may be used. The solid electrolyte may be formed on the anode by, for example, sputtering.

For example, an organic electrolyte solution may be prepared. The organic electrolyte solution may be prepared by dissolving a lithium salt in an organic solvent.

The organic solvent may be any suitable organic solvent in the art. Examples of the organic solvent include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and a combination thereof.

The lithium salt may be any material available as a lithium salt in the art. Examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_2x+1SO_2)(C_yF_2y+1SO_2)$ (wherein x and y are each independently a natural number), LiCl, LiI and a combination thereof.

Figure 6:
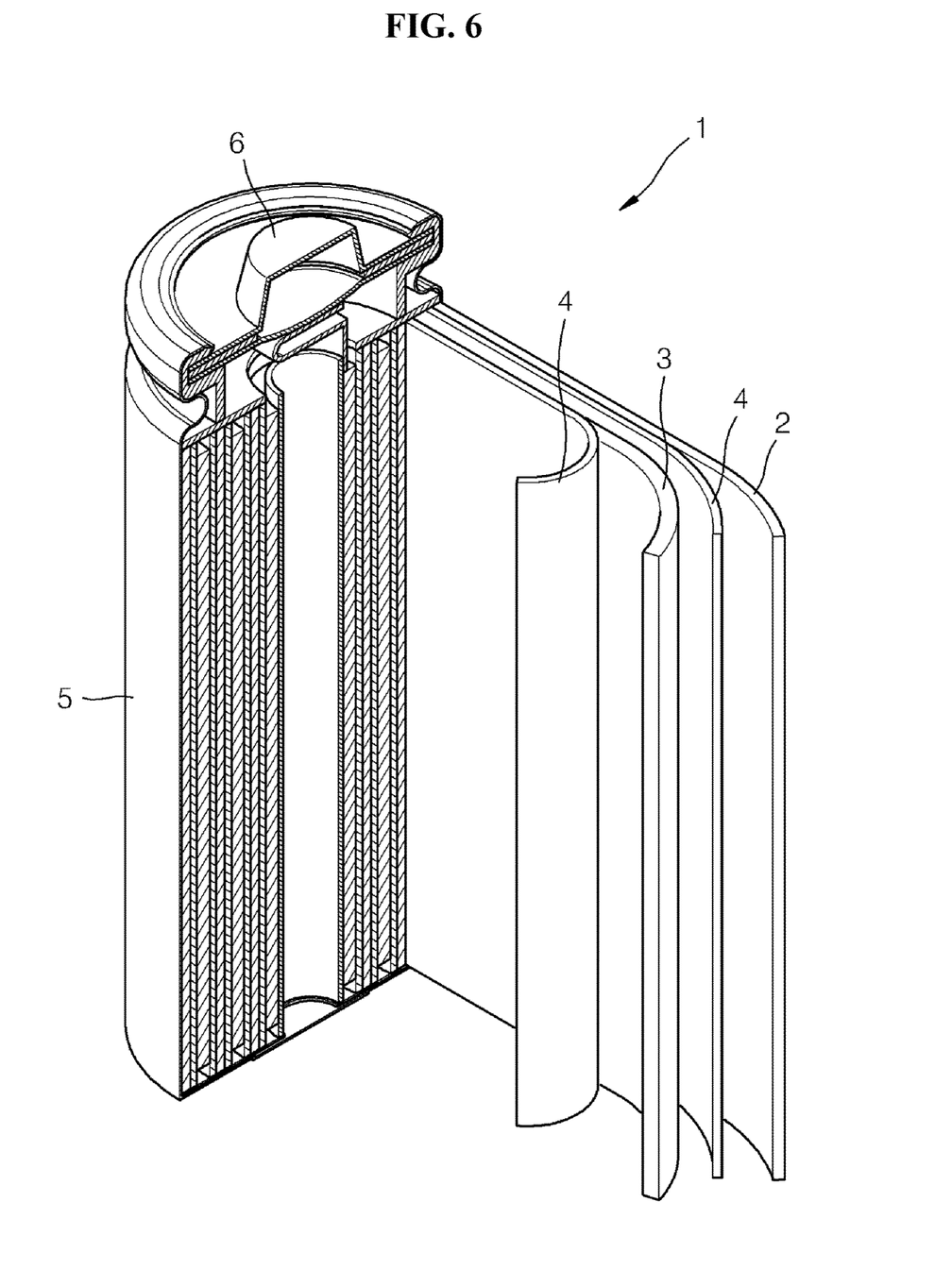
FIG. 6 is a schematic view of an embodiment of a lithium battery.

As illustrated in FIG. 6, a lithium battery 1 includes an anode 2, a cathode 3, and a separator 4. The anode 2, the cathode 3, and the separator 4 may be wound or folded, and then sealed in a battery case 5. Then, the battery case 5 may be filled with an organic electrolyte solution and sealed with a cap assembly 6, thereby completing the manufacture of the lithium battery 1. The battery case 5 may be a cylindrical type, a rectangular type, or a thin-film type battery case. For example, the lithium battery may be a thin-film type battery. The lithium battery may be a lithium ion battery.

The separator may be interposed between the cathode and the anode to form a battery assembly. Alternatively, the battery assembly may be stacked in a bi-cell structure and impregnated with the electrolyte solution. The resulting assembly may be put into a pouch and hermetically sealed, thereby completing the manufacture of a lithium ion polymer battery.

Alternatively, a plurality of battery assemblies may be stacked to form a battery pack, which may be used in a laptop computer, a smart phone, an electric vehicle (EV), and the like. The battery pack may provide improved high temperature and/or high rate performance.

A method of preparing an anode active material according to another embodiment includes: growing a metal oxide nanorod which extends in a direction away from a surface of a conductive substrate; forming a first metal layer including a first metal on the metal oxide nanorod to form a coated metal oxide nanorod; thermally treating the coated metal oxide nanorod to selectively remove the metal oxide and form a first metal nanotube; and forming a second metal layer including a second metal on the first metal nanotubes to form a multi-layer metal nanotube. The method of preparing the anode active material is schematically illustrated in FIG. 1B.

According to an embodiment of the method, the metal oxide nanorod may comprise at least one selected from ZnO, $Al_2O_3$, $SiO_2$, $ZrO_2$, $TiO_2$, and MgO.

According to an embodiment of the method, the first metal layer may include at least one metal selected from Si, Ge, Sb, Sn, Al, Zn, Ag, Au, Pt, Mo, W, and an alloy thereof, and the second metal layer may include at least one metal selected from Ge, Sb, Sn, Al, Zn, Ag, Au, Pt, Mo, W, and an alloy thereof.

In the growing of the metal oxide nanorod, which extend in a direction away from the surface of the conductive substrate, the metal oxide nanorod may be grown on the conductive substrate using any suitable method known in the art. For example, a nanoparticle may be coated on a conductive substrate, and the conductive substrate coated with the nanoparticle may be dipped in a solution comprising metal ions, thereby forming a metal oxide nanorod protruding from a surface of the conductive substrate. Alternatively, a metal oxide thin film layer may be coated on a conductive substrate, and the conductive substrate coated with the thin film layer may be dipped in a solution comprising metal ions, thereby forming a metal oxide nanorod protruding from a surface of the conductive substrate. The metal oxide nanorod may grow in a direction perpendicular to the surface of the conductive substrate.

In the forming a first metal layer including a first metal on the metal oxide nanorod to form a coated metal oxide nanorod, the first metal layer may be coated on the metal oxide nanorod using any suitable method known in the art.

For example, a first metal layer may be formed on a surface of the metal oxide nanorod by contacting the metal oxide nanorod with a first metal precursor gas. In detail, the first metal layer may be obtained by disposing a first metal precursor gas on the metal oxide nanorod.

The first metal precursor gas may be at least one selected from $SiH_4$, $SiCl_4$, $GeH_4$, and $GeF_4$, and is not limited thereto. Any compound including a first metal element, that may be gasified, and is available in the art may be used.

Also, the first metal precursor gas may further include a dopant precursor gas. By adding the dopant, a conductivity of the first metal layer, which comprises a Group 14 metal, may be increased. The dopant may be a Group 13 element or a Group 15 element. For example, the dopant may include B, Al, Ga, Tl, In, P, As, Sb, or Bi. The Group 13 element may be a p-type dopant, and the Group 15 element may be an n-type dopant.

The metal oxide nanorod may be contacted with the first metal precursor gas for about 1 minute to about 1000 minutes. For example, the contact time may be about 5 minutes to about 40 minutes. As the contact time increases, an outer diameter of the multilayer metal nanotube may increase.

Also, the contact between the first metal precursor gas and the metal oxide nanorods may be performed at a temperature of about 200° C. to about 800° C. For example, the temperature may be about 300° C. to about 700° C. For example, the temperature may be about 500° C. to about 600° C.

By thermally treating the metal oxide nanorod coated with the first metal layer, the metal oxide nanorod may be pyrolyzed and selectively removed, leaving the first metal layer. Consequently, a first metal layer in the form of a nanotube may be provided. For example, at a high temperature in an atmosphere of hydrogen (or argon), the nanorod may be selectively pyrolyzed instantly or may be pyrolyzed after undergoing reduction so as to be selectively removed.

According to an embodiment of the method, the metal oxide nanorod may be selectively removed in an atmosphere comprising at least one selected from hydrogen, argon, nitrogen, neon, and helium. The thermally treating to selectively remove the metal oxide nanorod may be at about 200° C. or greater. For example, the treating temperature may about 200° C. to about 800° C. For example, the treating temperature may about 500° C. to about 800° C.

In the forming of the second metal layer including a second metal on the first metal nanotube to form a multilayer metal nanotube, a second metal layer including a second metal may be disposed (e.g., coated) on the first metal nanotubes by any suitable method well-known in the art. The same method as the method of the disposing of the first metal layer may be used.

For example, a second metal layer including the second metal may be formed on the first metal layer by contacting the first metal layer with a second metal precursor gas. In detail, the second metal layer may be obtained by disposing a second metal precursor gas on the first metal layer. The second metal precursor gas may comprise at least one selected from $SiH_4$, $SiCl_4$, $GeH_4$, and $GeF_4$, and is not limited thereto, and it may comprise any compound that includes a second metal element and which may be gasified and is available in the art.

In addition, the second metal precursor gas may further include a dopant precursor gas. When the dopant precursor gas is added, a conductivity of the second metal layer comprising a Group 14 element may be increased. The dopant may be a Group 13 or Group 15 element. For example, the dopant may include B, Al, Ga, Tl, In, P, As, Sb, or Bi. The Group 13 element may be a p-type dopant, and the Group 15 element may be an n-type dopant.

The first metal oxide nanorod may be contacted with the second metal precursor gas for about 1 minute to about 1000 minutes. For example, the contact time may be about 5 minutes to about 40 minutes. As the contact time is increased, an outer diameter of the multilayer metal nanotubes or the like may increase. Also, the contacting of the second metal precursor gas and the metal oxide nanorod may be performed at a temperature of about 200° C. to about 800° C. For example, the temperature may be about 300° C. to about 700° C. For example, the temperature may be about 500° C. to about 600° C.

Hereinafter, an embodiment will be described in further detail with reference to Examples and Comparative Examples. However, the Examples and Comparative Examples are exemplary, and shall not limit the scope of the present disclosure.

EXAMPLES

Preparation of Anode Active Material and Anode

Example 1

ZnO nanorods were grown on a stainless steel substrate (available from Nialco, Tokyo, Japan) having a thickness of 15 µm, in a direction perpendicular to the substrate. In detail, radio frequency (RF) magnetron sputtering equipment was used to deposit a ZnO seed layer on a stainless steel substrate having a thickness of 15 µm and a diameter of 12 mm, and the substrate, on which the ZnO thin layer was deposited, was dipped in an aqueous solution of 0.025 molar (M) of zinc nitrate hexahydrate and 0.025 M of hexamethylene tetramine, and then left at 85° C. for 24 hours to grow ZnO nanorods on the substrate in a perpendicular direction. To increase a length of the ZnO nanorods, the aqueous solution was substituted with a new solution of the aqueous 0.025 molar (M) of zinc nitrate hexahydrate and 0.025 M of hexamethylene tetramine every three hours.

In a chemical vapor deposition (CVD) chamber, a hydrogen atmosphere and a temperature of 540° C. were maintained, and $H_2$ gas and $SiH_4$ gas (diluted in $H_2$ gas to 10 volume %) were supplied on the stainless steel substrate on which the ZnO nanorods were disposed for 20 minutes, at a flow rate of 10 to 30 standard cubic centimeters per minute (sccm) for $H_2$, and at 50 to 70 sccm for $SiH_4$, to form a silicon coating having a thickness of 15 nm thereon.

Next, the substrate, on which the silicon coated nanorods were disposed, was annealed in a hydrogen atmosphere at a temperature of 600° C. for 24 hours to selectively etch the ZnO to obtain a silicon nanotube that is vertically aligned on the stainless steel substrate.

Next, in a CVD chamber, a hydrogen atmosphere and a temperature of 330° C. were maintained, and $H_2$ gas and $GeH_4$ gas (diluted in $H_2$ gas to 10 volume %) were supplied on the stainless steel substrate on which the silicon nanotubes are vertically aligned for 20 minutes, at a flow rate of 30 to 50 sccm, to form a germanium coating layer having a thickness of 15 nm thereon to obtain silicon/germanium multilayer metal nanotubes.

At 20° C., a resistivity of silicon was 1000 ohms-meters ($\Omega \cdot m$), and a resistivity of germanium was 1$\Omega \cdot m$.

At 360° C., a diffusivity of lithium ions in the silicon was $1.47 \times 10^{-8}$ square centimeters per second ($cm^2/s$), and a diffusivity of lithium ions in the germanium was $2.14 \times 10^{-7}$ $cm^2/s$.

A volume expansion of silicon calculated based on Equation 1 was 400%, and that of germanium was 370%.

Figure 2A:
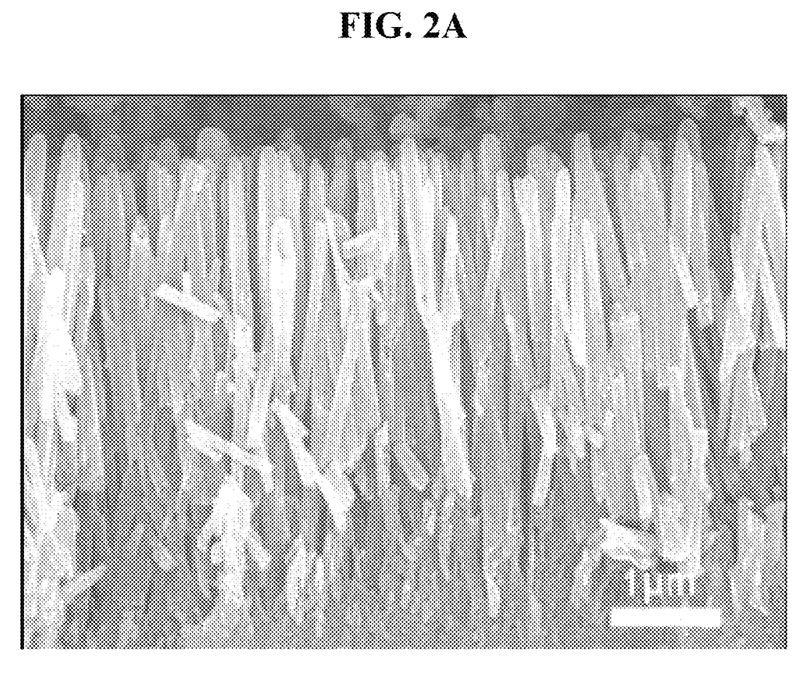
FIG. 2A is a scanning electronic microscope (SEM) image of a cross-section of an arrangement of multilayer metal nanotubes aligned vertically on a stainless steel substrate prepared according to Example 1.
Figure 2B:
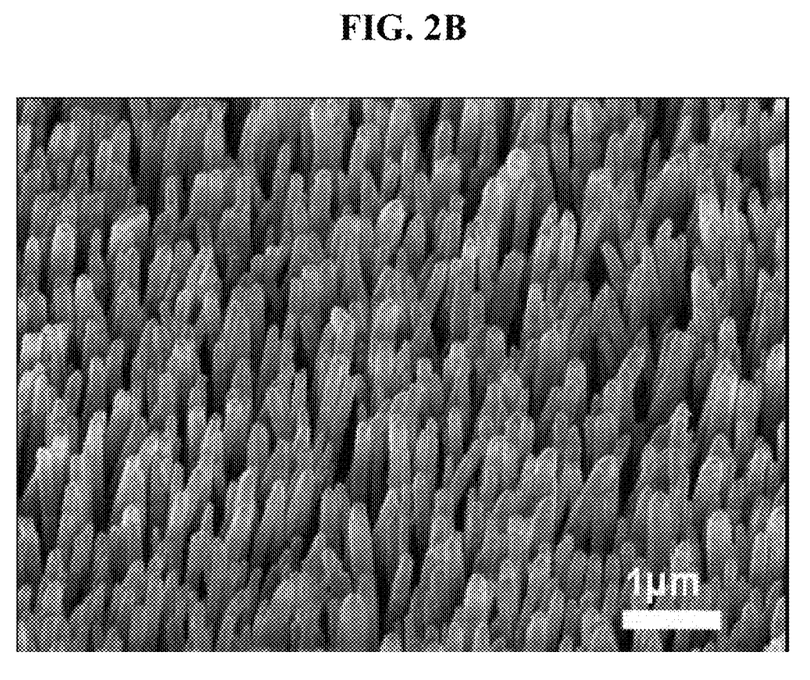
FIG. 2B is a SEM image of the arrangement of the multilayer metal nanotubes prepared according to Example 1, when viewed at 45°.
Figure 2C:
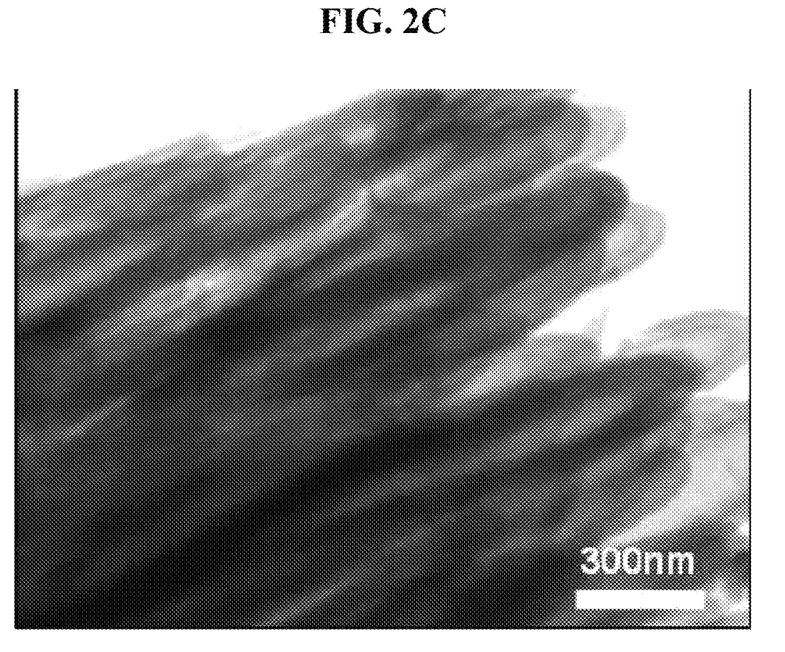
FIG. 2C is a transmission electronic microscopic (TEM) image of the multilayer metal nanotubes prepared according to Example 1.
Figure 2D:
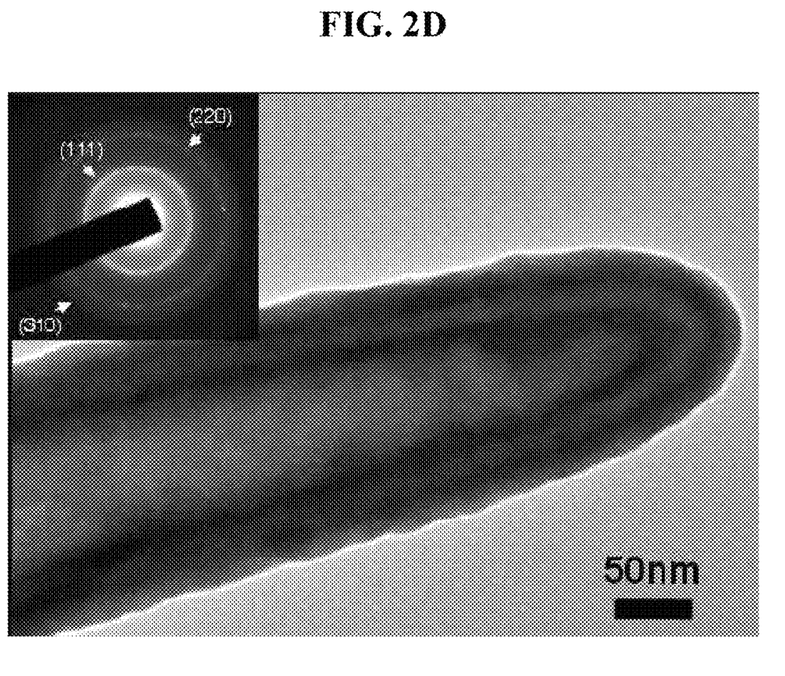
FIG. 2D is an enlarged TEM image of the multilayer metal nanotubes prepared according to Example 1.
Figure 2E:
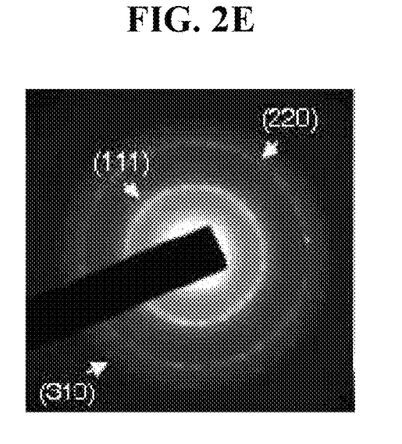
FIG. 2E shows a selected area electron diffraction (SAED) pattern of the multilayer metal nanotubes of FIG. 2D.
Figure 2F:
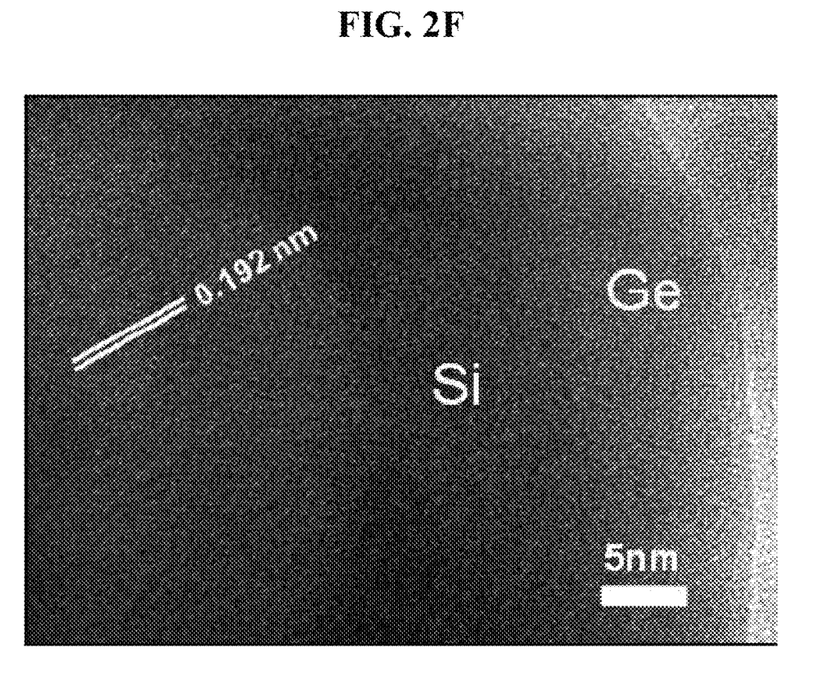
FIG. 2F is a high resolution TEM (HR TEM) image of a Si/Ge interface of the multilayer metal nanotube prepared according to Example 1.

FIGS. 2A and 2B are SEM images of the silicon/germanium multilayer metal nanotubes, and FIGS. 2C through 2F are TEM images thereof.

The images were taken using a field emission scanning electron microscope (FE-SEM) (S-4700, available by Hitachi city, Japan) and a field emission transmission electron microscope (FE-TEM) (JEM 2100F, available by JEOL, Tokyo, Japan).

As shown in FIGS. 2A through 2D, a wall thickness of the silicon/germanium multilayer metal nanotubes was 30 nanometers (nm). An inner diameter of the silicon/germanium multilayer metal nanotubes was 60 nm. An outer diameter of the silicon/germanium multilayer metal nanotubes was 90 nm. A length of the multilayer metal nanotubes was 4.5 µm.

As shown in the SAED pattern of FIG. 2E and a grid pattern of FIG. 2F, in the silicon/germanium multilayer metal nanotubes, the silicon was crystalline, and the germanium was amorphous.

Example 2

An anode active material was prepared in the same manner as Example 1 except that the supply time of the $H_2$ gas and $SiH_4$ gas was varied to 30 minutes, and the supply time of the $H_2$ gas and $GeH_4$ gas was varied to 10 minutes.

Example 3

An anode active material was prepared in the same manner as Example 1 except that the supply time of the $H_2$ gas and $SiH_4$ gas was varied to 10 minutes, and the supply time of the $H_2$ gas and $GeH_4$ gas was varied to 30 minutes.

Example 4

An anode active material was prepared in the same manner as Example 1 except that a mixed gas of $SiH_4$ and $PH_5$ in a volume ratio of 200:1 was supplied instead of $SiH_4$ gas, and a mixed gas of $GeH_4$ and $PH_5$ in a volume ratio of 200:1 was supplied instead of $GeH_4$ gas.

Comparative Example 1 (Si Nanotube)

ZnO nanorods were grown on a stainless steel substrate (available from Nialco, Tokyo, Japan) having a thickness of 15 µm, in a direction perpendicular to the substrate. In detail, radio frequency (RF) magnetron sputtering equipment was used to deposit a ZnO seed layer on a stainless steel substrate having a thickness of 15 µm and a diameter of 12 millimeters (mm), and the substrate, on which the ZnO thin layer was deposited, was dipped in an aqueous solution in which 0.025 M zinc nitrate hexahydrate and 0.025 M of hexamethylene tetramine were dissolved, and then left at 85° C. for 24 hours to grow ZnO nanorods on the substrate in a perpendicular direction. To increase a length of the ZnO nanorods, the aqueous solution was substituted by a new solution of the aqueous 0.025 M zinc nitrate hexahydrate and 0.025 M of hexamethylene tetramine every three hours.

In a CVD chamber, a hydrogen atmosphere and a temperature of 540° C. were maintained, and $H_2$ gas and $SiH_4$ gas (diluted in $H_2$ gas to 10 volume %) were supplied on the stainless steel substrate on which the ZnO nanorods are arranged, for 40 minutes, at a flow rate of 10 to 30 sccm for $H_2$, and at 50 to 70 sccm for $SiH_4$, to form a silicon coating layer having a thickness of 29 nm thereon.

Next, the substrate on which the nanorods coated with the silicon coating layer were disposed was annealed in a hydrogen atmosphere at a temperature of 600° C. for 24 hours to selectively etch only ZnO to obtain a silicon nanotube alignment that is vertically aligned on the stainless steel substrate.

Manufacture of Lithium Battery

Example 5

The silicon/germanium multilayer metal nanotubes vertically aligned on the conductive substrate manufactured according to Example 1 were used as a working electrode, lithium metal was used as a counter electrode, and a polypropylene film (Celgard 3510) was used as a separator, and a solution in which 1.3M $LiPF_6$ in ethylene carbonate (EC) and diethylene carbonate (DEC) (in a volume ratio: 3:7) was used as an electrolyte to manufacture a coin cell.

Examples 6-8

A lithium batteries was manufactured in the same manner as in Example 5 except that the anodes prepared according to Examples 2 to 4 were used as a positive electrode instead of the anode prepared in Example 1.

Comparative Example 2

A lithium battery was manufactured in the same manner as in Example 5 except that the anode prepared in Comparative Example 1 was used as the positive electrode instead of the anode prepared in Example 1.

Evaluation Example 1

Charging/Discharging Experiment

Figure 3:
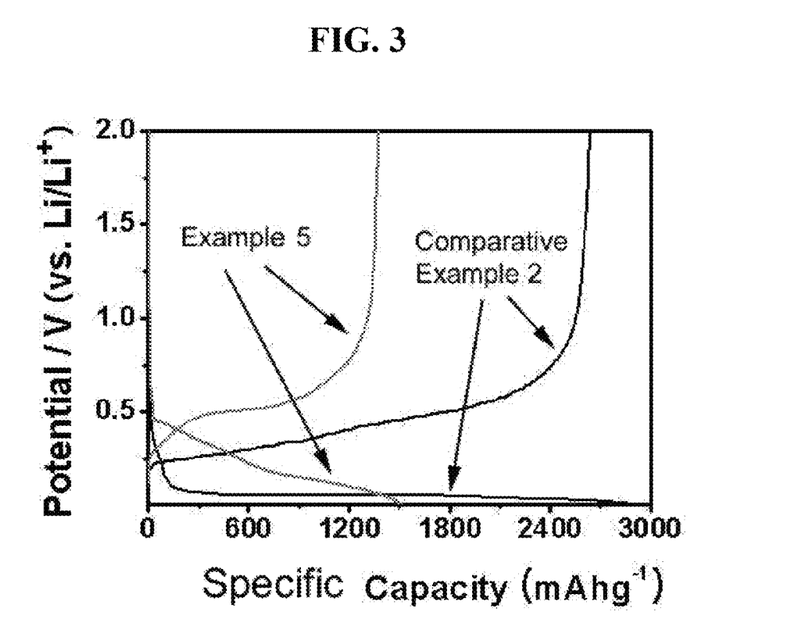
FIG. 3 is a graph of potential (volts versus Li/Li$^+$) versus specific capacity (milliampere-hours per gram, mAhg$^{-1}$) showing the results of charging and discharging of lithium batteries manufactured according to Example 5 and Comparative Example 2.
Figure 4:
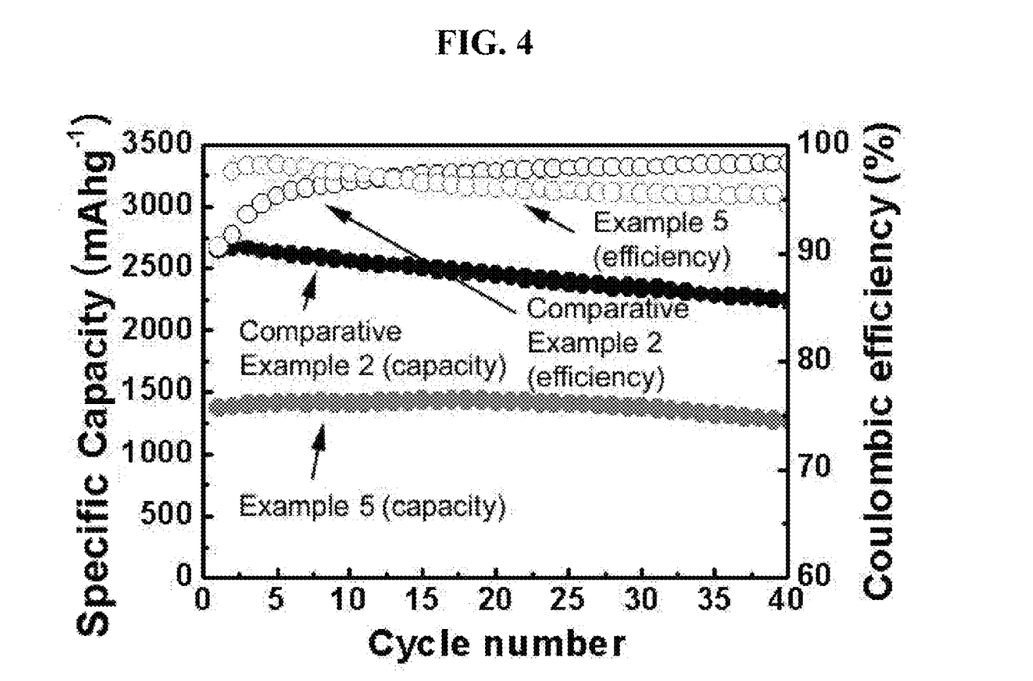
FIG. 4 is a graph of specific capacity (milliampere-hours per gram, mAhg$^{-1}$) and coulombic efficiency (percent, %) versus cycle number showing lifespan characteristics of lithium batteries manufactured according to Example 5 and Comparative Example 2.
Figure 5:
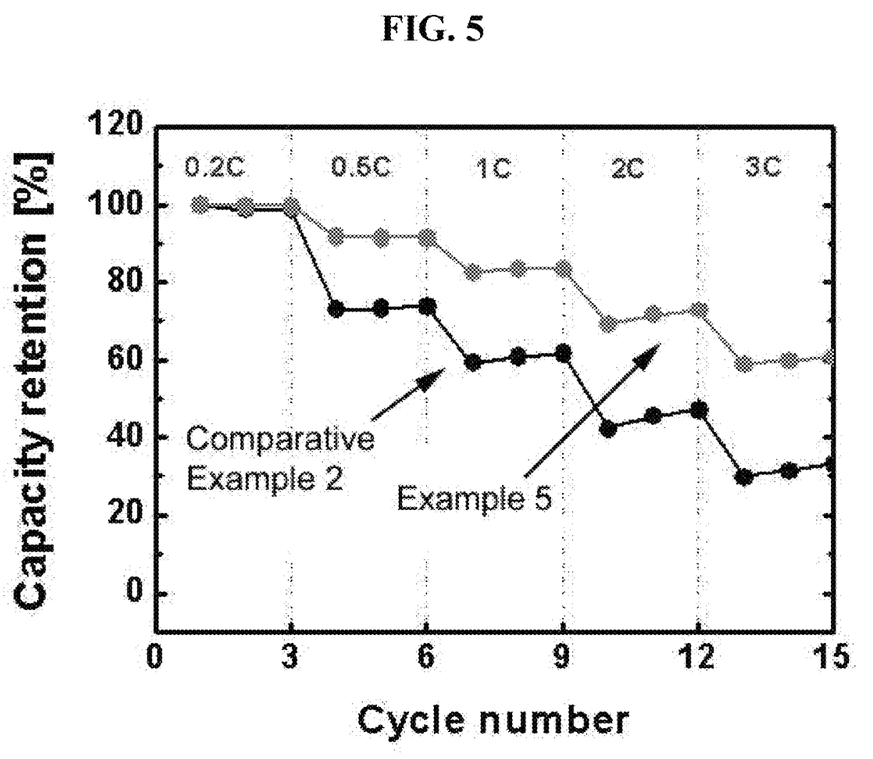
FIG. 5 is a graph of capacity retention (percent, %) versus cycle number showing high rate characteristics of lithium batteries manufactured according to Example 5 and Comparative Example 2.

The lithium batteries manufactured according to Examples 5 through 8 and Comparative Example 2 were charged with a current of 150 milliampere-hours per gram (mA/h/g) of an anode active material (metal nanotube) until a voltage of 0.01 V (vs. Li) was reached, and then were discharged again with the same current until a voltage of 2 V (vs. Li) was reached. Next, the charging and discharging were repeated 40 times with the same current and in the same voltage range. A portion of the test results of charging and discharging the batteries are shown in FIGS. 3 through 5.

Table 1 shows discharge capacity per unit weight, initial coulombic efficiency, and capacity retention of the metal nanotubes. In Table 1, the initial coulombic efficiency refers to a ratio of charge capacity and discharge capacity on the first cycle. The capacity retention, expressed as a percent, is calculated from Equation 3 below.

Capacity retention (%)=(discharge capacity of 40th cycle/discharge capacity of 1st cycle)×100%        Equation 3

TABLE 1

| | Inner layer of nanotubes | Outer layer of nanotubes | Initial Discharging efficiency [mAh/g] | Initial coulombic efficiency [%] | Capacity retention ratio of 40th cycle[%] |
|---|---|---|---|---|---|
| Example 5 | Si | Ge | 1373 | 90.7 | 92.7 |
| Example 6 | Si | Ge | 2115 | 90.2 | 87.2 |
| Example 7 | Si | Ge | 1728 | 90.1 | 91.0 |
| Example 8 | Si | Ge | 1365 | 89.1 | 90.5 |
| Comparative Example 2 | Si | Si | 2645 | 90.4 | 84.8 |

As shown in FIGS. 3 and 4 and Table 2, the multilayer metal nanotubes provide an initial charge capacity of 1300 mAh/g or higher, and provide a capacity retention of 87% or higher after 40 cycles. Also, the initial coulombic efficiency and capacity retention of the multilayer metal nanotubes are improved as compared to silicon metal nanotubes.

Evaluation Example 2

High-Rate Characteristics

The coin cells manufactured according to Examples 5 through 8 and Comparative Example 2 were charged with a constant current at a 0.2 C rate in a voltage range of 0 to 2.0 V (vs. L1 metal) at room temperature and discharged to measure discharge capacity and capacity retention of the coil cells at an increased discharge current density at a constant current, as shown in FIG. 5 and Table 2. The current densities during discharge were at a 0.2C, 0.5C, 1C, 2C, and 3C rate, respectively. The capacity retention at each rate is calculated from Equation 4 below.

Capacity retention [%]=(discharging capacity/discharging capacity at 0.2C)×100%    Equation 4

TABLE 2

| | Capacity retention [%] | | | | |
|---|---|---|---|---|---|
| | 0.2 C | 0.5 C | 1 C | 2 C | 3 C |
| Example 5 | 100 | 91 | 83 | 72 | 60 |
| Example 7 | 100 | 89 | 81 | 69 | 58 |
| Example 8 | 100 | 88 | 79 | 65 | 54 |
| Comparative Example 2 | 100 | 74 | 61 | 47 | 33 |

As can be seen from FIG. 4 and Table 2, the multilayer metal nanotubes according to the above embodiment provide significantly improved high-rate characteristics compared to silicon metal nanotubes.

According to the above embodiment, multilayer metal nanotubes including an inner layer and an outer layer comprising different metals provide improved rate capability, capacity retention, and high-rate characteristics.

It should be understood that the exemplary embodiments described therein should be considered in a descriptive sense only and not for purposes of limitation. Descriptions of features, advantages, or aspects within each embodiment should be considered as available for other similar features or aspects in other embodiments.

What is claimed is:

1. An anode active material comprising
a multilayer metal nanotube comprising:
   an inner layer; and
   an outer layer on the inner layer,
   wherein the inner layer comprises a first metal having an atomic number equal to 13 or higher, and the outer layer comprises a second metal different from the first metal, and
   wherein the second metal has a resistivity which is less than a resistivity of the first metal.

2. The anode active material of claim 1, wherein the second metal has a lithium ion diffusivity which is greater than a lithium ion diffusivity of the first metal.

3. The anode active material of claim 1, wherein the second metal has a volume expansion during charging which is less than a volume expansion during charging of the first metal.

4. The anode active material of claim 1, wherein the first metal is at least one selected from silicon, germanium, antimony, tin, aluminum, zinc, silver, gold, platinum, molybdenum, tungsten, and an alloy thereof.

5. The anode active material of claim 1, wherein the first metal is a Group 14 element.

6. The anode active material of claim 1, wherein the second metal is at least one selected from germanium, antimony, tin, aluminum, zinc, silver, gold, platinum, molybdenum, tungsten, and an alloy thereof.

7. The anode active material of claim 1, wherein the outer layer comprises a composite of the first metal and the second metal.

8. The anode active material of claim 1, wherein the inner layer is crystalline and the outer layer is amorphous.

9. The anode active material of claim 1, wherein at least one of the inner layer and the outer layer further comprises a dopant.

10. The anode active material of claim 9, wherein the dopant is a Group 13 element or a Group 15 element.

11. The anode active material of claim 1, further comprising at least one layer disposed between the inner layer and the outer layer.

12. The anode active material of claim 1, wherein a wall thickness of the metal nanotube is about 10 nanometers to about 200 nanometers.

13. The anode active material of claim 1, wherein a thickness of the inner layer is about 5 nanometers to about 100 nanometers.

14. The anode active material of claim 1, wherein a thickness of the outer layer is about 5 nanometers to about 100 nanometers.

15. The anode active material of claim 1, wherein an outer diameter of the metal nanotube is about 30 nanometers to about 400 nanometers.

16. The anode active material of claim 1, wherein an inner diameter of the metal nanotube is about 20 nanometers to about 200 nanometers.

17. The anode active material of claim 1, wherein a length of the metal nanotube is about 1 μm to about 50 μm.

18. The anode active material of claim 1, wherein an end of the metal nanotube is closed.

19. An anode comprising the anode active material according to claim 1.

20. The anode of claim 19, comprising:
   a conductive substrate; and
   a plurality of multilayer metal nanotubes disposed on the conductive substrate.

21. The anode of claim 20, wherein the multilayer metal nanotubes are disposed at a regular interval on the conductive substrate.

22. The anode of claim 20, wherein the multilayer metal nanotubes extend away from a surface of the conductive substrate.

23. The anode of claim 20, wherein the metal nanotubes extend in in a direction which is perpendicular to a surface of the conductive substrate.

24. The anode of claim 20, wherein the conductive substrate comprises at least one selected from stainless steel, copper, iron, nickel, aluminum, and cobalt.

25. A lithium battery comprising the anode of claim 19.

26. A method of preparing an anode active material, the method comprising:
   growing a metal oxide nanorod which extends away from a surface of a conductive substrate;
   forming a first metal layer comprising a first metal on the metal oxide nanorod to form a coated metal oxide nanorod;
   thermally treating the coated metal oxide nanorod to selectively remove the metal oxide nanorod and form a first metal nanotube; and
   forming a second metal layer comprising a second metal on the first metal nanotube to form a multilayer metal nanotube to prepare the anode active material,
   wherein the anode active material comprises a multilayer metal nanotube comprising
   an inner layer, and
   an outer layer on the inner layer,
      wherein the inner layer comprises a first metal having an atomic number equal to 13 or higher, and the outer layer comprises a second metal different from the first metal, and
      wherein the second metal has a resistivity which is less than a resistivity of the first metal.

27. The method of claim 26, wherein the metal oxide is at least one selected from ZnO, $Al_2O_3$, $SiO_2$, $ZrO_2$, $TiO_2$, and MgO.

28. The method of claim 26, wherein the first metal layer comprises at least one selected from silicon, germanium, antimony, tin, aluminum, zinc, silver, gold, platinum, molybdenum, tungsten, and an alloy thereof.

29. The method of claim 26, wherein the second metal layer comprises at least one selected from germanium, antimony, tin, aluminum, zinc, silver, gold, platinum, molybdenum, tungsten, and an alloy thereof.

30. The method of claim 26, wherein the forming of the first metal layer comprises contacting the metal oxide nanorod with a first metal precursor gas.

31. The method of claim 30, wherein the first metal precursor gas is at least one selected from $SiH_4$, $SiCl_4$, $GeH_4$, and $GeF_4$.

32. The method of claim 30, wherein the first metal precursor gas further includes a dopant precursor gas.

33. The method of claim 30, wherein the contacting of the first metal precursor gas and the metal oxide nanorod is performed at about 200° C. to about 800° C. for about 1 minute to about 1000 minutes.

34. The method of claim 26, wherein the thermally treating the coated metal oxide nanorod to selectively remove the metal oxide nanorod is performed in an atmosphere of at least one selected from hydrogen, argon, nitrogen, neon, and helium.

35. The method of claim 26, wherein the thermally treating the coated metal oxide nanorod to selectively remove the metal oxide nanorod is performed at a temperature of about 200° C. or greater.

36. The method of claim 26, wherein the forming of the second metal layer comprises contacting the first metal nanotube with a second metal precursor gas.

37. The method of claim 36, wherein the second metal precursor gas is at least one selected from $SiH_4$, $SiCl_4$, $GeH_4$, and $GeF_4$.

38. The method of claim 36, wherein the second precursor gas further comprises a dopant precursor gas.

39. The method of claim 36, wherein the first metal nanotube is contacted with the second metal precursor gas at about 200° C. to about 800° C. for about 1 minute to about 1000 minutes.

* * * * *